United States Patent
Lai

(10) Patent No.: US 7,699,517 B2
(45) Date of Patent: Apr. 20, 2010

(54) LIGHT EMITTING DIODE BASED SURFACE LIGHTING DEVICE

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 128 days.

(21) Appl. No.: 11/965,773

(22) Filed: Dec. 28, 2007

(65) Prior Publication Data

US 2009/0109672 A1  Apr. 30, 2009

(30) Foreign Application Priority Data

Oct. 25, 2007  (CN) .................. 2007 1 0202260

(51) Int. Cl.
*F21V 7/04* (2006.01)
(52) U.S. Cl. .................. 362/615; 362/555; 362/612; 362/613; 362/628
(58) Field of Classification Search .............. 362/555, 362/612, 613, 615, 628, 629
See application file for complete search history.

(56) References Cited

U.S. PATENT DOCUMENTS

| 7,014,351 B2 * | 3/2006 | Leu et al. ............... 362/625 |
| 2004/0095743 A1 * | 5/2004 | Yu et al. ............... 362/31 |
| 2005/0111235 A1 * | 5/2005 | Suzuki et al. ............... 362/555 |

OTHER PUBLICATIONS

Atsushi Okuno et al., Unique White LED Packaging Systems, 2003 IEEE Electronic Components and Technology Conference.

* cited by examiner

*Primary Examiner*—Sandra L O'Shea
*Assistant Examiner*—Meghan K Dunwiddie
(74) *Attorney, Agent, or Firm*—Frank R. Niranjan

(57) ABSTRACT

An LED surface lighting device (100) comprises a plurality of LED light source modules (120) assembled together side-by-side. Each of the LED light source modules comprises a light guiding plate (122) and at least one LED (124). The light guiding plate comprises a light emitting surface (1222) and a plurality of lateral sides (1225, 1227) adjacent to the light emitting surface. At least one of the lateral sides defines a groove (123) for receiving the at least one LED. The groove keeps a predetermined distance (D) from the light emitting surface.

20 Claims, 10 Drawing Sheets

LIGHT EMITTING DIODE BASED SURFACE LIGHTING DEVICE

BACKGROUND OF THE INVENTION

1. Field of the Invention

The present invention relates to a surface lighting device, and more particularly to a surface lighting device using light emitting diodes as light source.

2. Description of the Related Art

Light emitting diodes (LEDs) have many advantages, such as high luminance brightness, low power consumption, good compatibility with integrated circuit, long-term reliability and environment friendliness compared with other conventional lighting devices. Thus, LEDs have been widely used as backlight source for liquid crystal display (LCD), light source for vehicle lamps and luminance devices, as described in an article titled "Unique White LED Packaging Systems" cited in a publication of 2003 IEEE Electronic Components and Technology Conference written by Atsushi Okuno.

In related art, LED surface lighting device is divided into edge type and direct type according to LED positions. In the direct type LED surface lighting device, LEDs are arranged at a bottom of a light guiding plate for supplying light rays. However, a size of the LED surface lighting device currently becomes larger and larger, and correspondingly it is required to increase size of the light guiding plate and number of the LEDs used in the light source device. Accordingly, cost of the direct type LED surface lighting device increases.

Referring to FIG. 9, an edge type LED light source module 420 comprises a light guiding plate 422 and two LEDs 424 arranged at lateral sides 4220 of the light guiding plate 422. Light rays emitted from the LEDs 424 enter into the light guiding plate 422 from the lateral sides 4220, and then emit out of a light emitting surface 4222 adjacent to the lateral sides 4220.

Referring to FIG. 10, a surface lighting device 400 having a large size is formed by assembling a plurality of the LED light source modules 420 side-by-side. Light rays from the LEDs 424 at the lateral sides 4220 of a single LED light source module 420 can only emit towards the opposite lateral sides 4220 and out of the light emitting surface 4222 of the single LED light source module 420. The light rays cannot arrive at a seam area 430 between two adjacent LED light source modules 420. Thus, a dark area is formed above the seam area 430 so that illumination uniformity of the surface lighting device 400 cannot be satisfactorily obtained.

Accordingly, what is needed is a LED surface lighting device having a satisfactory illumination uniformity.

SUMMARY OF THE INVENTION

In accordance with a preferred embodiment of the present invention, an LED surface lighting device comprises a plurality of LED light source modules assembled together side-by-side. Each of the LED light source modules comprises a light guiding plate and at least one LED. The light guiding plate comprises a light emitting surface and a plurality of lateral sides adjacent to the light emitting surface. At least one of the lateral sides defines a groove for receiving the at least one LED. The groove keeps a predetermined distance from the light emitting surface.

Other advantages and novel features of the present invention will become more apparent from the following detailed description of preferred embodiment when taken in conjunction with the accompanying drawings, in which:

DETAILED DESCRIPTION OF THE INVENTION

Figure 1:
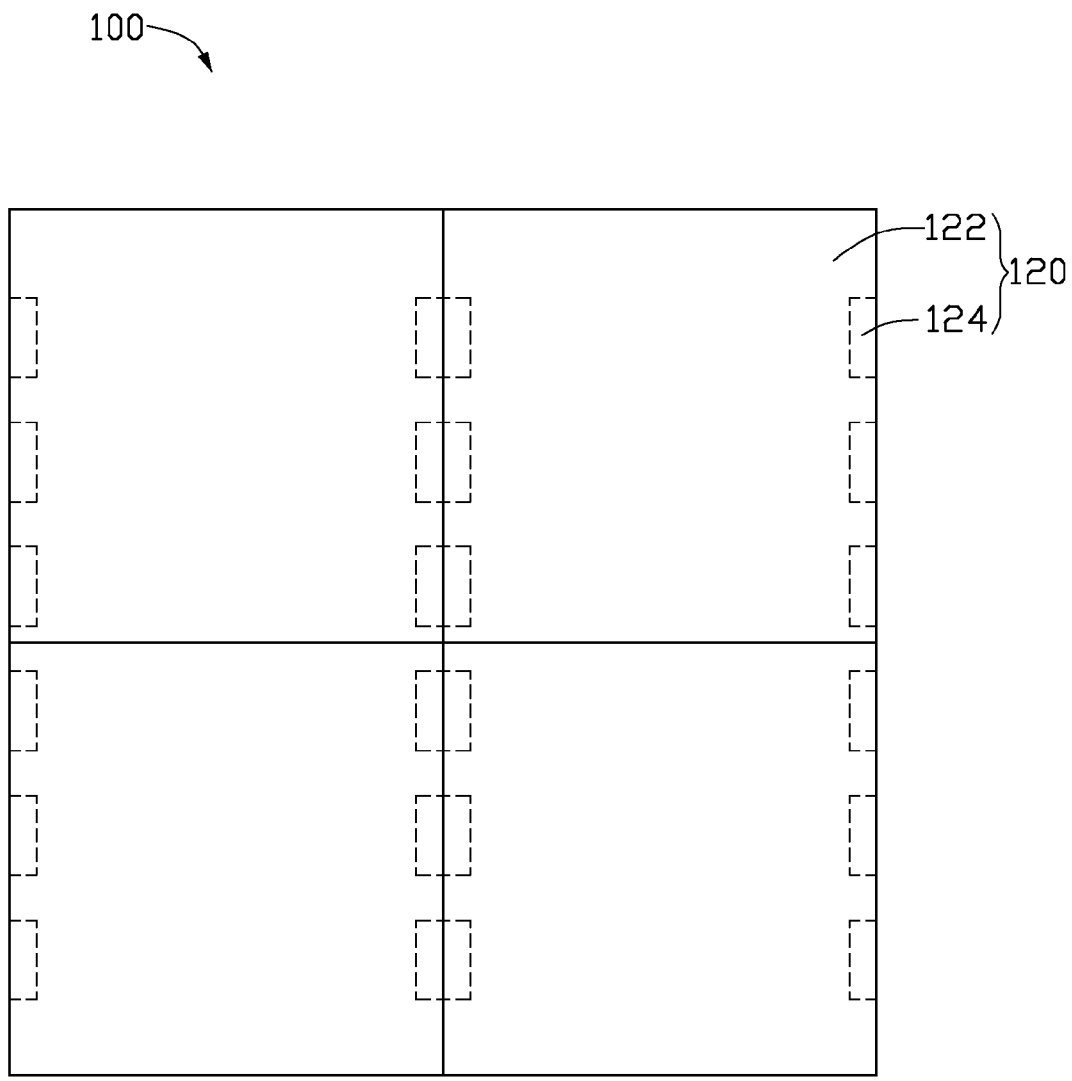
FIG. 1 is a top plan view of an LED surface lighting device in accordance with a preferred embodiment of the present invention.

Referring to FIG. 1, an LED surface lighting device 100 in accordance with a preferred embodiment is shown. The LED surface lighting device 100 is formed by assembling a plurality of LED light source modules 120 side-by-side. Each of the LED light source modules 120 comprises a light guiding plate 122 and a plurality of LEDs 124 contained in the light guiding plate 122.

Figure 2:
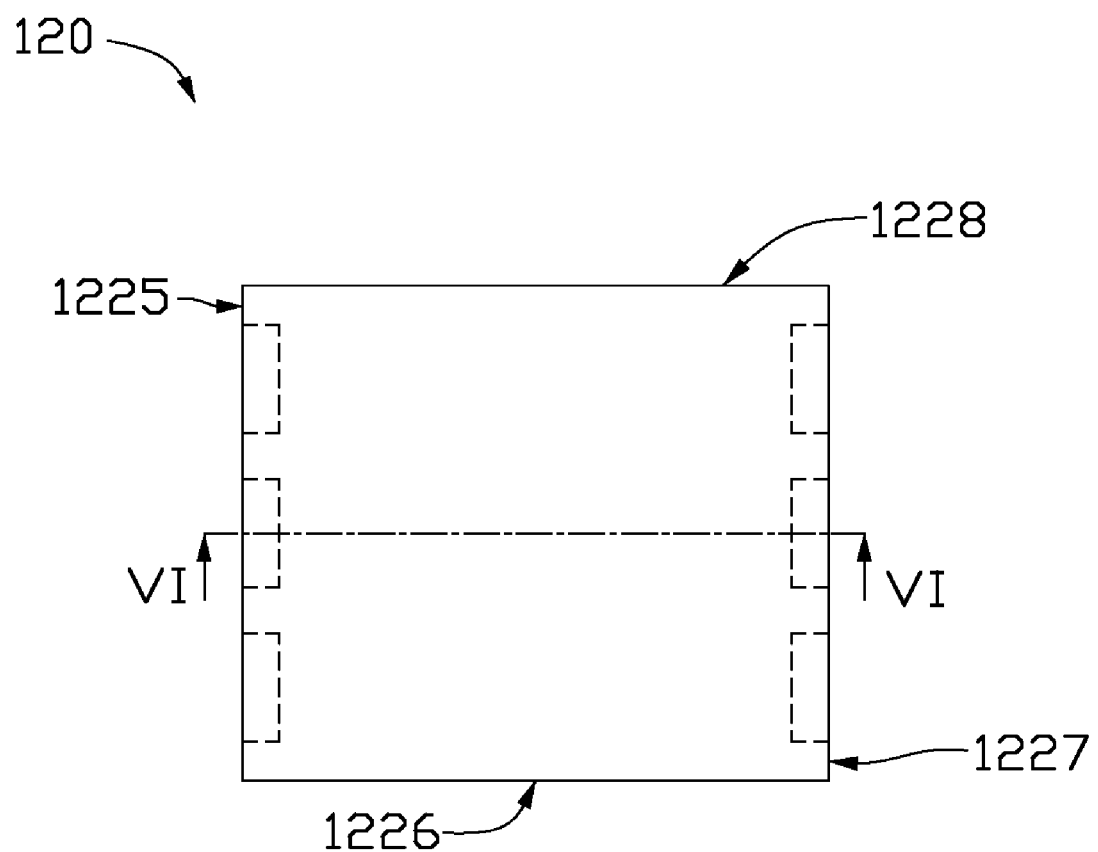
FIG. 2 is a top plan view of an LED light source module of the LED surface lighting device shown in FIG. 1.
Figure 3:
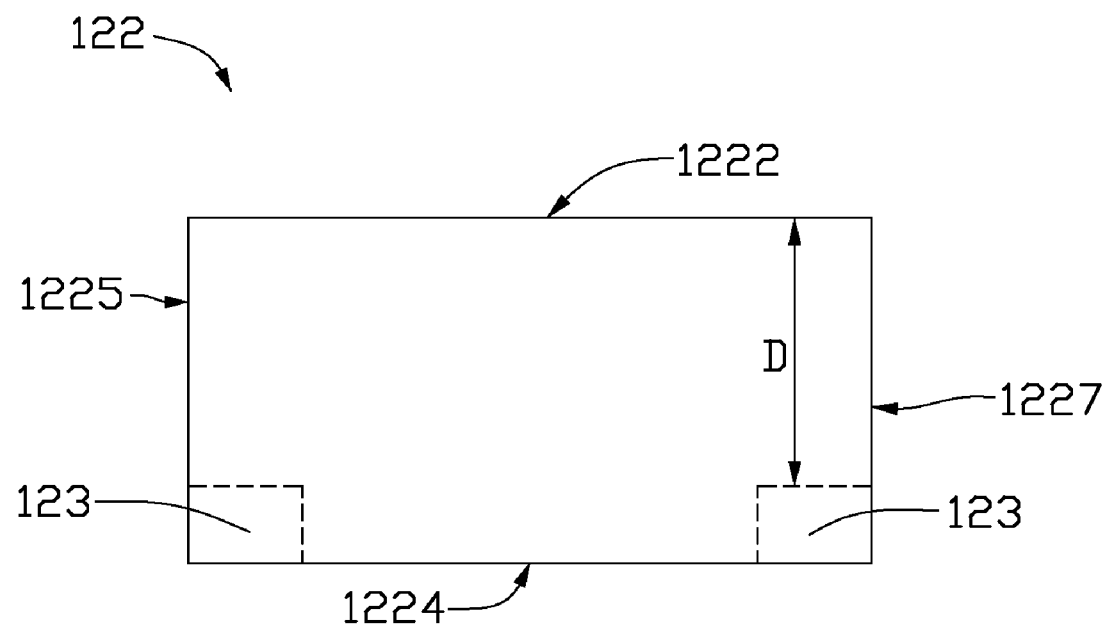
FIG. 3 is a front side view of a light guiding plate of the LED light source module shown in FIG. 2.

Referring to FIG. 2 and FIG. 3, the light guiding plate 122 has a light emitting surface 1222 at a top thereof, a bottom surface 1224 opposite to the light emitting surface 1222 and four lateral sides 1225, 1226, 1227, 1228 between the light emitting surface 1222 and the bottom surface 1224. The lateral sides 1225, 1226, 1227, 1228 are connected with the light emitting surface 1222 and the bottom surface 1224. The lateral sides 1225, 1226, 1227, 1228 are each covered by a light reflective metal film. The bottom surface 1224 is painted with a light reflective paint. Thus, light rays striking on the lateral sides 1225, 1226, 1227, 1228 and the bottom surface 1224 can be reflected. The lateral sides 1225, 1227 are plane surfaces, and each defines three grooves 123 therein. The grooves 123 are located adjacent to the bottom surface 1224 and keep a distance D from the light emitting surface 1222. The distance D between the groove 123 and the light emitting surface 1222 is determined according to need in applications. Two adjacent LED light source modules 120 are placed together, by one of the lateral sides 1225, 1226, 1227, 1228 of the light guiding plate 122 of one of the two adjacent LED light source modules 120 abutting against one of the lateral sides 1225, 1226, 1227, 1228 of the light guiding plate 122 of the other one of the two adjacent LED light source modules 120.

The light guiding plate 122 can be made by a material selected from the group consisting of polymethyl methacrylate (PMMA), polycarbonate, polyacrylate, glass, silicone, quartz and epoxy through which light can penetrate.

Figure 4:
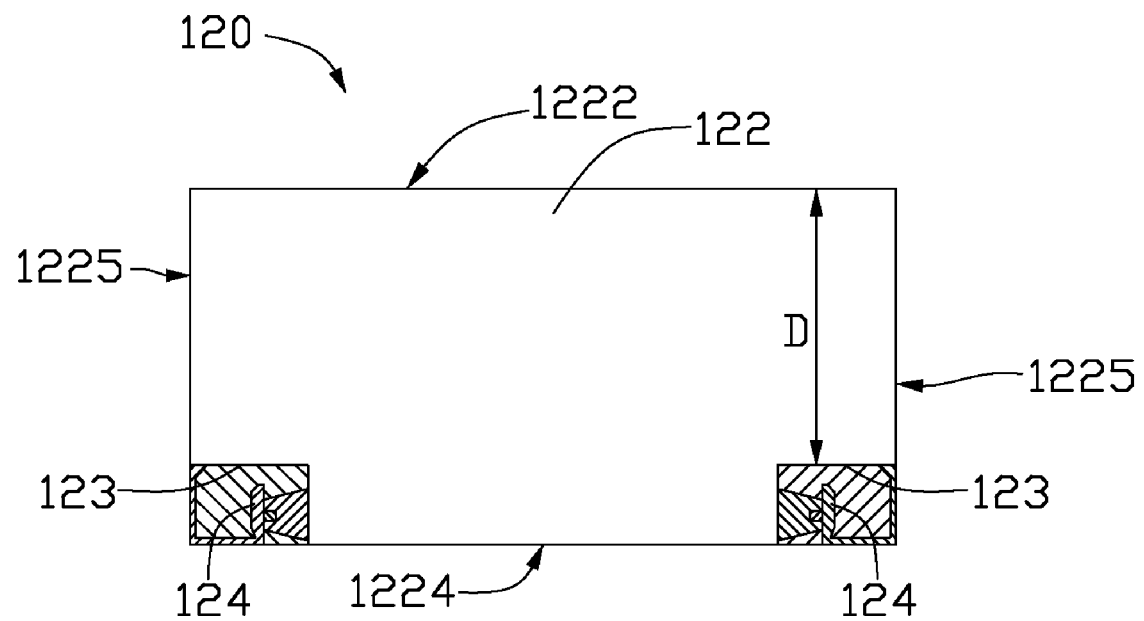
FIG. 4 is a cross-sectional view of the LED light source module shown in FIG. 2, along line VI-VI thereof.

Referring to FIG. 4, the LEDs 124 are respectively received in the grooves 123 of the light guiding plate 122. The LEDs 124 can be adhered to the light guiding plate 122 by adhesive material. As shown in FIG. 2, six LEDs 124 are used to generate light rays in the LED light source module 120. The six LEDs 124 are preferably side-emitting type LEDs, so that light rays generated by the side-emitting type LEDs 124 can easily enter into the light guiding plate 122.

Figure 5:
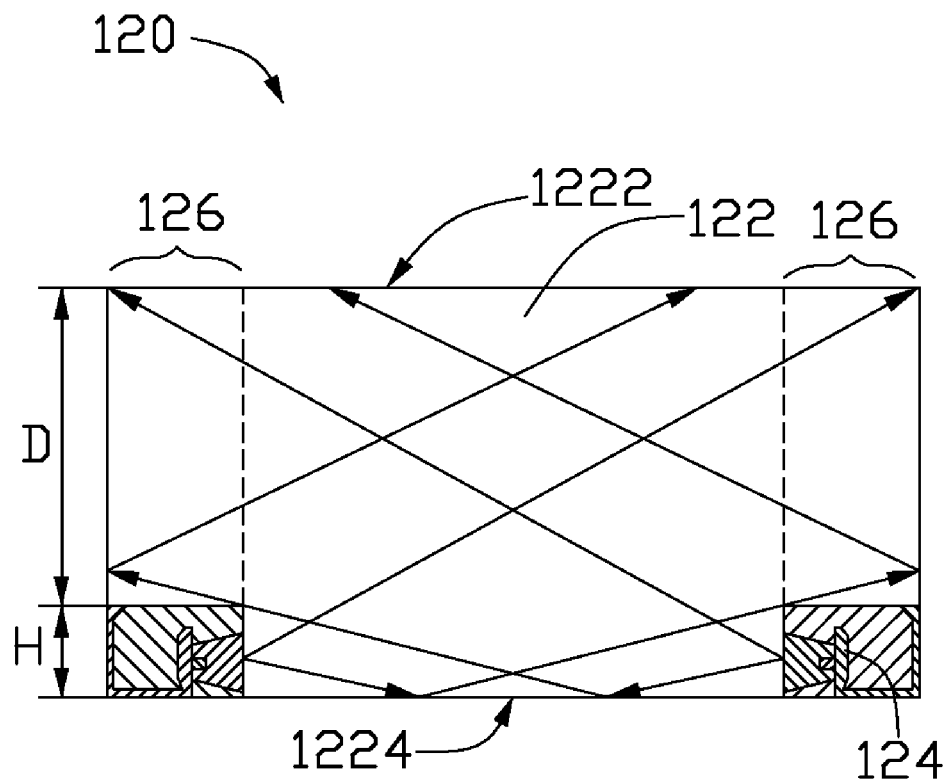
FIG. 5 is similar to FIG. 4, but shows the light path of the light rays emitted from LEDs.

Referring to FIG. 5, the light rays emitted from the LEDs 124 transmit into the light guiding plate 122. The light rays strike on the bottom surface 1224, the lateral sides 1225, 1226, 1227, 1228, and are reflected back into the light guiding plate 122 and finally emit out of the light guiding plate 122 via the light emitting surface 1222. The light rays can reach and pass through a side area 126 of the light emitting surface 1222 over the LEDs 124 arranged at each side of the lateral sides 1225, 1227. Thus, the side areas 126 above the LEDs 124 in the light guiding plates 122 of the LED light source modules 120 are illuminated. In the LED surface lighting device 100 comprised of the LED light source modules 120, the side areas 126 can be illuminated to eliminate dark areas to obtain satisfactory illumination uniformity. It is understood that the distance D increases, light rays that reach and pass through the side areas 126 are more. The distance D is preferably greater than or same as a height H of the groove 123 along a direction perpendicular to the light emitting surface 1222. Thus, the LED surface lighting device 100 has good illumination uniformity. The distance D is determined according to need in different applications. For example, the distance D can be less than the height H of the groove 123 in an application requiring a relatively low level of illumination uniformity. Correspondingly, a thickness of the light guiding plate 122 can be reduced in order to obtain an LED surface lighting device 100 with a smaller size.

Figure 6:
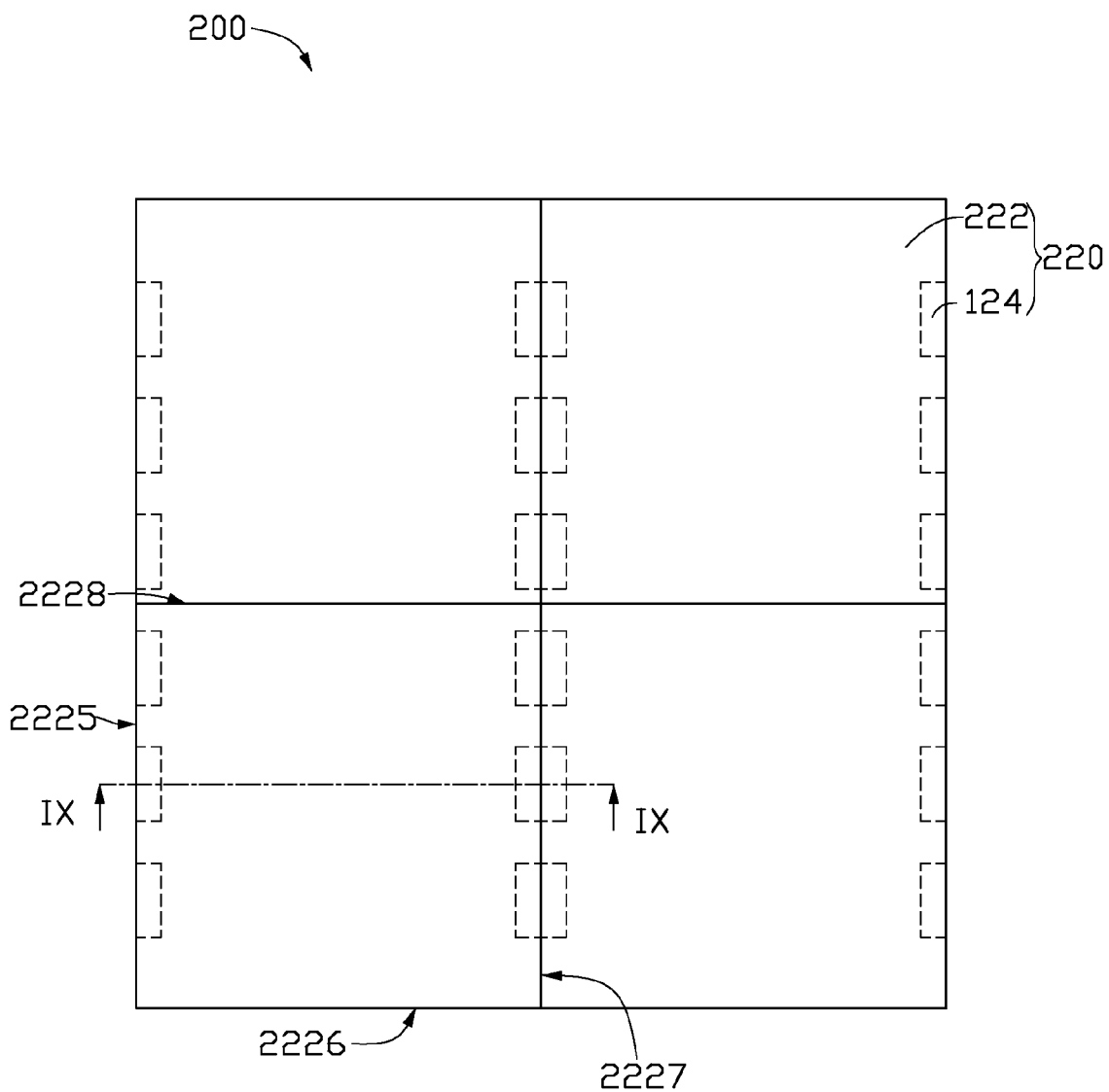
FIG. 6 is a top plan view of an LED surface lighting device in accordance with a second embodiment of the present invention.
Figure 7:
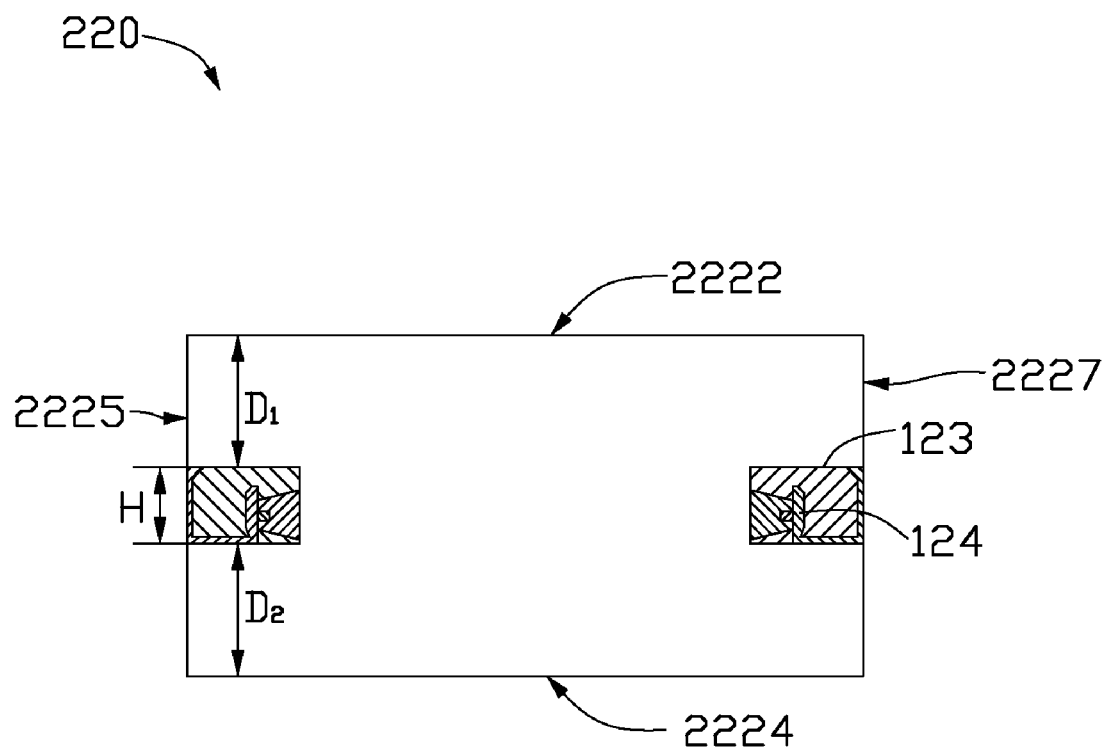
FIG. 7 is a cross-sectional view of an LED light source module from the LED surface lighting device shown in FIG. 6, along line IX-IX thereof.

Referring to FIG. 6 and FIG. 7, an LED surface lighting device 200 in accordance with a second preferred embodiment is shown. The LED surface lighting device 200 has a similar configuration to the LED surface lighting device 100 of the first embodiment. The LED surface lighting device 200 is formed by assembling a plurality of LED light source modules 220. Each of the LED light source modules 220 comprises a light guiding plate 222 and a plurality of LEDs 124. The difference between the LED surface lighting device 100 and the LED surface lighting device 200 is that each of the LED light source modules 220 comprises two light emitting surfaces 2222, 2224 at top and bottom sides of the light guiding plate 222. The LED light source module 220 has a plurality of lateral sides 2225, 2226, 2227, 2228 between the two light emitting surfaces 2222, 2224 and each lateral side 2225, 2226, 2227, 2228 is covered with a piece of light reflective metal film. Each of the LED light source modules 220 defines a plurality of grooves 123 at the lateral sides 2225, 2227. The grooves 123 keep distances D1, D2 respectively from the top and bottom light emitting surfaces 2222, 2224. The distance D1 can be the same as or different from the distance D2. The distances D1, D2 are preferably greater than or the same as the height H of the groove 123. Light rays from the LEDs 124 can emit out of the light guiding plate 222 from the light emitting surfaces 2222, 2224.

Figure 8:
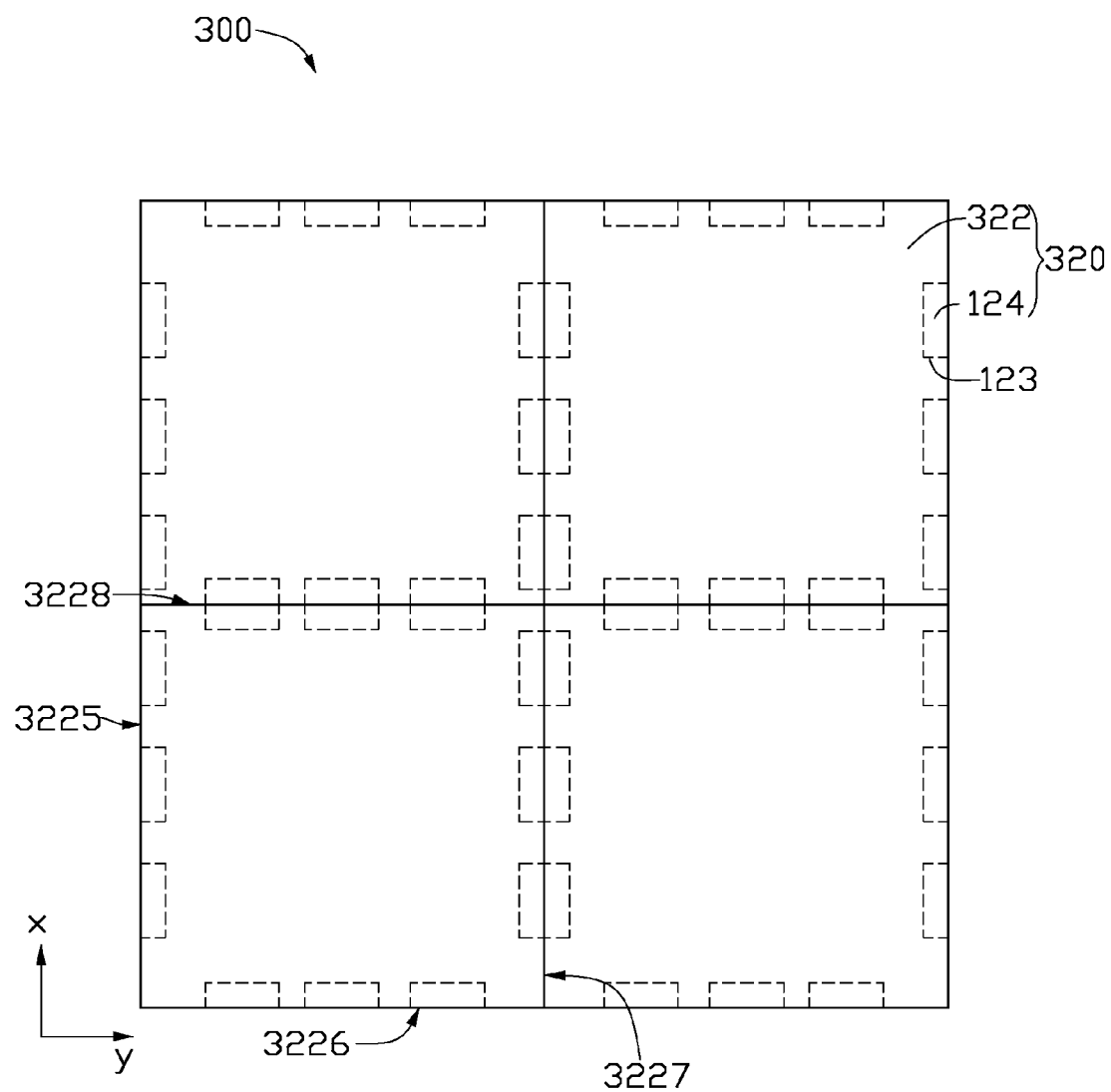
FIG. 8 is a top plan view of an LED surface lighting device in accordance with a third embodiment of the prevent invention.
Figure 9:
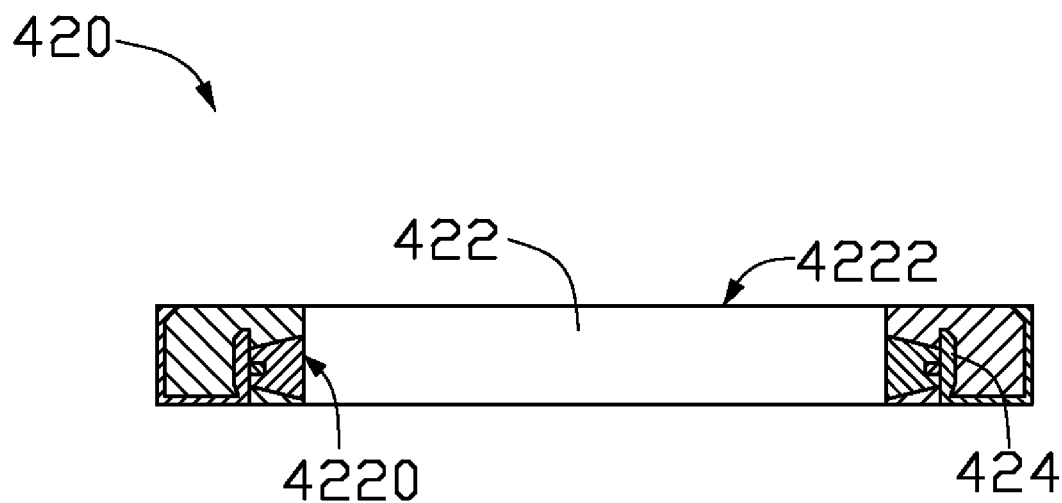
FIG. 9 is a cross-sectional view of an edge type LED light source module in related art.
Figure 10:
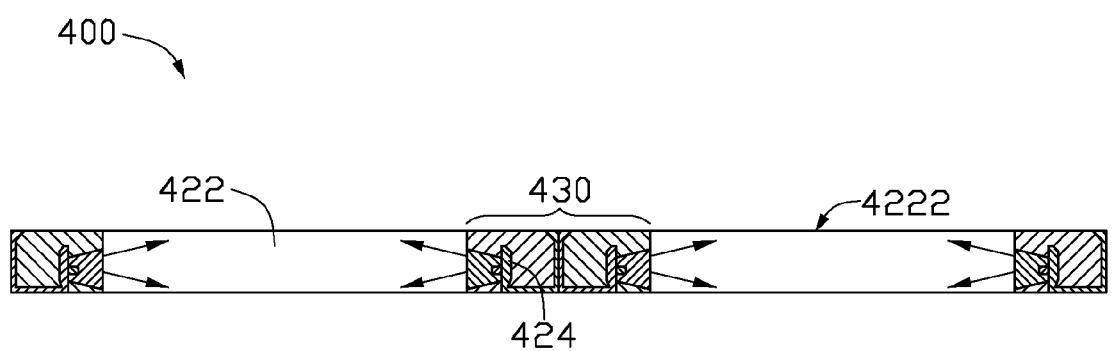
FIG. 10 is a cross-sectional view of an edge type LED surface lighting device formed by assembling a plurality of the edge type LED light source modules shown in FIG. 9.

Referring to FIG. 8, an LED surface lighting device 300 in accordance with a third preferred embodiment of the present invention is shown. The LED surface lighting device 300 has a similar configuration to the LED surface lighting device 100 of the first embodiment. The LED surface lighting device 300 is formed by assembling a plurality of LED light source modules 320. Each of the LED light source modules 320 comprises a light guiding plate 322 and a plurality of LEDs 124. The light guiding plate 322 of each LED light source module 320 has four lateral sides 3225, 3226, 3227, 3228. The difference between the LED surface lighting device 100 and the LED surface lighting device 300 is that each of the lateral sides 3225, 3226, 3227, 3228 defines a plurality of grooves 123 therein. Each of the grooves 123 receives an LED 124 therein. The LEDs 124 can provide light rays along X and Y directions. Therefore, the LED surface lighting device 300 can provide illumination more uniformly.

It is understood that the number of the grooves 123 defined in each lateral side of the light guiding plates 122, 222, 322 of the three embodiments described above can be one or more than one. Shapes and arrangements of the grooves 123 can also be defined according to application requirements. The light guiding plates 122, 222, 322 can also have other shapes.

What is claimed is:

1. An LED surface lighting device comprising:
    a plurality of LED light source modules assembled together side-by-side, each of the LED light source modules comprising a light guiding plate and at least one LED positioned for emitting light rays toward the light guiding plate; wherein the light guiding plate comprises a light emitting surface through which the light rays are output from the light guiding plate, and a plurality of lateral side surfaces adjacent to the light emitting surface, at least one of the lateral side surfaces defines a groove, the at least one LED is entirely received in the groove, and the groove is spaced from the light emitting surface and keeps a predetermined distance from the light emitting surface along a direction perpendicular to the light emitting surface.

2. The LED surface lighting device as described in claim 1, wherein the light guiding plate comprises a bottom surface opposite to the light emitting surface, the lateral side surfaces are connected between the light emitting surface and the bottom surface, and the groove extends through to the bottom surface.

3. The LED surface lighting device as described in claim 1, wherein the predetermined distance is greater than or the same as a height of the groove along a direction perpendicular to the light emitting surface.

4. The LED surface lighting device as described in claim 1, wherein the light guiding plate further comprises another light emitting surface opposite to the light emitting surface, the lateral side surfaces are connected between the light emitting surface and the another light emitting surface, and the groove is spaced from the another light emitting surface and keeps another predetermined distance from the another light emitting surface along a direction perpendicular to the another light emitting surface.

5. The LED surface lighting device as described in claim 4, wherein the predetermined another distance is greater than or the same as a height of the groove along a direction perpendicular to the light emitting surface.

6. The LED surface lighting device as described in claim 1, wherein more than one of the lateral side surfaces define the groove for receiving more than one LED.

7. The LED surface lighting device as described in claim 4, wherein the groove is defined in each of the lateral side surfaces.

8. The LED surface lighting device as described in claim 1, wherein the light guiding plate is made of a material selected from the group consisting of polymethylmethacrylate (PMMA), polycarbonate, polyacrylate, glass, silicone, quartz and epoxy.

9. The LED surface lighting device as described in claim 1, wherein the light guiding plate is rectangular shaped.

10. The LED surface lighting device as described in claim 1, wherein the plurality of LED light source modules are assembled together with each of the at least one lateral side surface receiving the LED of one LED light source module abutting against a corresponding one of the lateral side surfaces receiving the LED of an adjacent LED light source module.

11. An LED light source module configured for forming an LED surface lighting device assembled by a plurality of the LED light source modules, the LED light source module comprising:
 a light guiding plate; and
 at least one LED configured for emitting light rays toward the light guiding plate, wherein the light guiding plate comprises a light emitting surface through which the light rays are output from the light guiding plate and a plurality of lateral side surfaces adjacent to the light emitting surface, at least one of the lateral side surfaces defines a groove receiving an entirety of the at least one LED, and the groove is spaced from the light emitting surface and keeps a predetermined distance from the light emitting surface along a direction perpendicular to the light emitting surface.

12. The LED light source module as described in claim 11, wherein the light guiding plate comprises a bottom surface opposite to the light emitting surface, the lateral side surfaces are connected between the light emitting surface and the bottom surface, and the groove extends through to the bottom surface.

13. The LED light source module as described in claim 11, wherein the predetermined distance is greater than or the same as a height of the groove along a direction perpendicular to the light emitting surface.

14. The LED light source module as described in claim 11, wherein the light guiding plate further comprises another light emitting surface opposite to the light emitting surface, the lateral side surfaces are connected between the light emitting surface and the another light emitting surface, and the groove keeps another predetermined distance from the another light emitting surface.

15. The LED light source module as described in claim 14, wherein the another predetermined distance is greater than or the same as a height of the groove along a direction perpendicular to the light emitting surface.

16. The LED light source module as described in claim 11, wherein more than one of the lateral side surfaces define the groove for receiving more than one LED.

17. The LED light source module as described in claim 16, wherein the groove is defined in each of the lateral side surfaces.

18. The LED light source module as described in claim 11, wherein the light guiding plate is made of a material selected from the group consisting of polymethylmethacrylate (PMMA), polycarbonate, polyacrylate, glass, silicone, quartz and epoxy.

19. An LED surface lighting device comprising:
 a first LED,
 a first light guiding plate comprising a light emitting surface and a side surface substantially perpendicular to the light emitting surface, a recess defined in the side surface, and the first light guiding plate having a light incident surface located in the recess, the entire first LED being received in the recess and facing toward the light incident surface, the recess being spaced from the light emitting surface and keeping a predetermined distance from the light emitting surface along a direction perpendicular to the light emitting surface,
 a second LED, and
 a second light guiding plate comprising a light emitting surface and a side surface substantially perpendicular to the light emitting surface, a recess defined in the side surface, and the second light guiding plate having a light incident surface located in the recess, the entire second LED being received in the recess and facing toward the light incident surface, the recess being spaced from the light emitting surface and keeping a predetermined distance from the light emitting surface along a direction perpendicular to the light emitting surface;
 wherein the side surface of the first light guiding plate abuts against the side surface of the second light guiding plate.

20. The LED surface lighting device as described in claim 19, wherein the light incident surface of the first light guiding plate is substantially parallel to the side surface of the first light guiding plate, and the light incident surface of the second light guiding plate is substantially parallel to the side surface of the second light guiding plate.

* * * * *